May 20, 1969 R. W. SPAUDE 3,445,802

ADJUSTABLE ELECTRONIC COMPONENT

Filed Aug. 16, 1967 Sheet 1 of 4

INVENTOR
ROBERT W. SPAUDE

BY [signature]

ADJUSTABLE ELECTRONIC COMPONENT

Filed Aug. 16, 1967

INVENTOR
ROBERT W. SPAUDE

BY Arnold J. Ericsen

INVENTOR
ROBERT W. SPAUDE
BY [signature]

INVENTOR

ROBERT W. SPAUDE

BY [signature]

United States Patent Office 3,445,802
Patented May 20, 1969

3,445,802
ADJUSTABLE ELECTRONIC COMPONENT

Robert W. Spaude, Milwaukee, Wis., assignor to Allen-Bradley Company, Milwaukee, Wis., a corporation of Wisconsin Filed Aug. 16, 1967, Ser. No. 660,957
Int. Cl. H01c 5/02
U.S. Cl. 338—167 8 Claims

ABSTRACT OF THE DISCLOSURE

An adjustable electronic component wherein the electrical properties between two or more terminals may be varied and controlled, and including a resistance element such as a cermet layer, a contact brush, a movable actuator for the contact brush and means for moving the brush actuator in a parallel path relative to the resistance element. The brush actuator includes a cavity having an inclined surface for receiving the contact brush, an element having a rounded surface contacting the inclined surface of the actuator and resilient element interposed between the rounded member and the cavity surface opposite the inclined surface to urge the member with the rounded surface against the brush to thereby urge the brush towards electrical engagement with the resistance element.

This application is a continuation-in-part of application Ser. No. 556,745 filed June 10, 1966, now U.S. Patent Ser. No. 3,350,673, by the same applicant.

This invention relates to an adjustable electronic component apparatus such as is commonly employed for variable potentiometers, rheostats, capacitors, switches and the like wherein the electrical properties between two or more terminals may be varied and controlled. The invention resides more specifically in adjustable electronic components that may be compacted within small overall dimensions for use in electronic circuits having a great number of components confined within small space limitations, or in other instances where compactness or light weight are of dominating concern. The invention, in one embodiment, may comprise a casing having a molded rotor positioned within the casing and rotational therein, the rotor includes a cavity opening transverse to said rotational axis and having an inclined top surface; a stationary base member positioned within the casing in alignment with the rotor, the base supporting a plurality of individually spaced apart leads which extend through the base to the exterior thereof, the base further supporting a plurality of electrical contact surfaces spaced apart in insulative relationship and facing the cavity, each of said contact surfaces electrically engaging the internal end of a lead; and electrically conductive brush member having a front plane and a back plane and having contacts on the front plane to simultaneously engage said contact surfaces on the front surface of said stationary base, the brush member positioned at least in part within said cavity and rotatable with the rotor such that when the rotor is in the proper rotational position said brush contacts bridge said front contact surfaces; resilient means positioned within said cavity, a rounded member simultaneously engaging the resilient means, the inclined top surface of the cavity and the back plane of the brush thereby maintaining the resilient means under compression and urging the brush contacts in engagement with the stationary base.

The present invention is further applicable to linearly arranged electronic components, such as rectilinear potentiometers, trimmer devices and other devices having elongated resistance elements and parallel conductive elements (in the case of potentiometers) arranged in a longitudinal plane spaced from a substantially coextensive lead screw for motivating a threaded contact brush actuator.

The structure of the present adjustable apparatus lends itself readily to the trend of miniaturized circuits wherein trimmer resistors, capacitors or switching components are necessary. In designing such components, a common handicap resides in fabricating an assembly of such small components. The various components of the structures are generally very small and require tedious handling during the assembling process, especially where it is necessary to solder or weld various components. Also, manufacturing tolerances of the various components are generally critical due to the small size and when the tolerances are not held, the structure proves inoperable. The present design provides a structure which may be very easily manufactured and whereby all necessary soldering steps may be accomplished prior to assembly of the various components into the casing. The various components of the apparatus may be individually made in large quantities prior to assembly. Then each individual component may be sorted and assembled without the requirement of special tools or fasteners. Also, the design is such that dimensional tolerances of the individual components is somewhat relaxed without hindering the operation of the apparatus. Accordingly, the apparatus is economical to manufacture and is rugged in design while maintaining small dimensions.

The invention further provides an assembly whereby as the brush contacts wear, there is automatic compensation for the wear and a constant pressure maintained between the brush and contact surfaces. The brush and ball assembly constantly engage the brush such that as the contacts wear the resilient means, e.g. a spring, expands, thereby maintaining the rounded member, e.g. a small ball, against the back plane of the brush and urging it against the stationary member.

The above advantages and features of this invention will appear in the description to follow. In the description, reference is made to the accompanying drawings in which there is shown by way of illustration a variable resistive element in the form of a potentiometer incorporating the principles of this invention.

Figures 1, 2, 3, 4, 5:
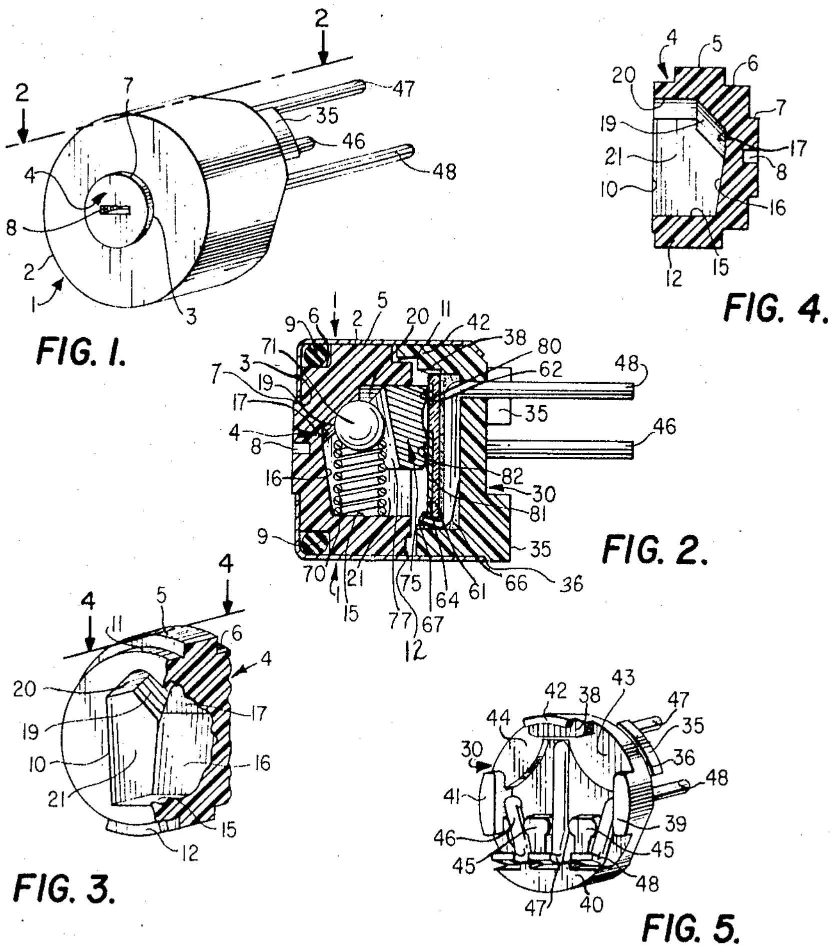
FIG. 1 is a perspective view of an assembled potentiometer according to the principles of the present invention with the back and side surfaces most evident (assuming that the conductive leads extend from the front surface).
FIG. 2 is a cross-sectional view taken along the line 2—2 of FIG. 1.
FIG. 3 is a perspective view, in part broken away, of a rotor component incorporated in the potentiometer of FIGS. 1 and 2.
FIG. 4 is a cross-sectional view of the rotor component taken along the line 4—4 of FIG. 3.
FIG. 5 is a perspective view of a stator component carrying the electrical leads of the illustrated potentiometer.

The embodiment of the invention as illustrated in in FIGS. 1–10, inclusive, is in a form suitable for use as a miniature potentiometer of the type commonly employed in communication and control circuits. The illustrated embodiment has been constructed of dimensions in the order of ⅜" in height and width with highly satisfactory mechanical and electrical results. The apparatus is designated by a general reference character 1. The potentiometer 1 includer a cup-shaped, non-oriented casing 2 having a circular recess therein with an end aperture 3 the center of which coincides with the longitudinal axis of the casing. As will be hereinafter further appreciated, the casing 2 serves as a means of providing strength and maintaining the other components of the potentiometer in properly assembled position. Depending on the atmosphere of the actual application, the casing 2 may be stamped from a metallic substance or molded of a plastic material. The potentiometer further comprises a brush actuator in the form of a substantially cylindrical rotor component, designated by the general reference character 4, positioned coaxially within the casing 2. The rotor 4 is preferably formed of a molded synthetic resin. Viewing the rotor 4 from the rear surface, best illustrated by FIGS. 3, 4 and 9, it carries three distinct steps 5, 6 and 7. The step 5 forms the outermost diametrical dimension and its diameter is slightly less than the internal diameter of the casing 2 thereby permitting the rotor 2 to rotate therein. The rise between steps 7 and 6 engages the internal bottom surface of the casing 2 leaving a void space between the corner of the casing 2 and the rotor 4. The step 7 is also of circular cross dimensions with the diameter slightly less than the diameter of the aperture 3 thereby permitting the rotor to protrude therethrough. The rotor 4 carries a slot 8 within the area protruding through the aperture permitting a tool, for instance a screwdriver, to engage and adjust the rotor position. As best illustrated in FIG. 2, the otherwise void space intermediate steps 5 and 6 carries a pliant O-ring 9. The O-ring 9, which may be comprised of silicone, neoprene, or other type rubber, simultaneously snugly engages the step 6 and the interior surface of the casing 2 thereby providing a moisture seal while permitting rotational movement.

Viewing the front surface of the rotor 4 (FIGS. 3, 4 and 10) a coffin-shaped cavity 10 opens towards the front. The rotor 4 also carries an intermediate step 11 between the outermost step 5 and the cavity 10. The step 11 permits rotational engagement with respect to the stationary members of the potentiometer 1 which will hereinafter be described in detail. The step 11 further carries a stop member 12 such that the rotor 4 cannot be continuously rotated in one direction. The cavity 10 is molded to include a flat bottom surface 15 which is parallel with the rotational axis and normal to the back planar surface of the rotor 4. Engaging the bottom surface 15 and at an angle slightly greater than ninety degrees is a first back plane surface 16. The surface 16 extends part way up the back of the cavity 10 where its top edge engages the bottom edge of a plane surface 17. The surface 17 takes the form of an isosceles-triangular-shaped plane facing the front of the cavity 10 and normal to the bottom surface 15. Engaging each of the equal sided edges of the plane 17 is the back edge of a first top surface in the form of an inverted substantially V-shaped surface 19. Each plane of the V-shaped surfaced 19 merges with a common apex which is positively sloped with respect to the rotational axis towards the cavity opening. In the illustrated embodiment, the vertex slopes at approximately 45° with respect to the axis of rotation. The top surface 19 does not extend to the front surface. The front edge of the plane 19 engages the back edge of a second top surface in the form of an inverted substantially V-shaped planar surface 20. Each plane of the V-shaped surface 20 merges with a common apex which is parallel with the rotational axis. The front edge of the plane 20 extends to the front surface of the rotor 4. Flanking each side of the cavity 10 is a five-edged side plane 21. The bottom edge of each plane 21 is common to a side edge of the bottom surface plane 15. A rear edge of each plane 21 joins a side edge of the black planar surface 16. A first top edge of each plane 21 joins a side edge of the V-shaped planar surface 19 and a second top edge engages the side edge of the V-shaped planar surface 20. The front edge of each side plane of the surfaces 21 is common to the front surface of the rotor 4.

Within the recess of the casing 2 and aligned with the front of the rotor 4 is a stationary structure comprising a molded base 30 of insulative material, the extreme outer dimensions of which are circular coinciding with the internal dimensions of the casing 2. The base 30 which is best illustrated by FIGS. 5, 8, 9 and 10, carries three apertures 32, 33 and 34 which are resigned to accommodate lead wires extending therethrough. The front portion of the molded base 30 (see FIG. 10) carries three standoff feet 35 which, when a metal casing is included, insulate the potentiometer 1 from a mounting surface, for example a printed circuit board (not shown). Each of the feet 35 carry an exterior step 36 (FIGS. 2, 5 and 8) that extends over the end of the metal casing 2. The step 36, in turn, engages the edge of the casing 2 thereby controlling the distance the molded base 30 slides within the casing 2. Intermediate each of the feet 35, the front edge of the base 30 is flattened to provide an inclined surface 37 (see FIGS. 2 and 10). The surfaces 37 permit a metal casing 2 to be crimped and engage the surfaces 37 thereby structurally securing the casing 2 and molded stationary base 30 in turn preventing the apparatus from pushing apart.

On the rear face of the base 30 facing the cavity 10, are four evenly spaced positioning ears 38, 39, 40 and 41. The ears each have arcuate outer dimensions coinciding with the internal radial distance of the casing 2, thereby permitting the casing 2 to fit over the ears and engage the steps 36 of the stand-off feet 35. The interior dimensions of each positioning ear form a chord with the chords of adjacent positioning ears being substantially normal to each other. As will be hereinafter described, this permits placement of a square-shaped resistive element within the positioning ears. It may be noted that the positioning ear 38 carries a molded tip 42. The tip 42 serves in conjunction with the mechanical stop 12 of the rotor 4 to prevent complete rotation of the rotor 4. Intermediate the positioning ears 38 and 39 is an arcuate raised ledge 43. Intermediate the positioning ears 38 and 41 is another arcuate raised ledge 44 similar to that of 43 such that the aperture opening 33 is intermediate the raised edges 43 and 44. Also intermediate the positioning ears 39 and 41 and intermediate the apertures 32 and 34 is a pair of insulating bumps 45. The raised ledges 43 and 44 and the insulating bumps 45 are all of equal height and less than the height of the positioning ears 38, 39, 40 and 41, thereby establishing a flat plane intermediate the positioning ears on which a resistance element may be positioned and supported. Furthermore, the ledges 43 and 44 and bumps 45 form the side surfaces of a well so that a set of conductive lead wires 46, 47 and 48 may protrude through the apertures 32, 33 and 34, respectively. The leads 46, 47 and 48 preferably comprise a material, such as copper, which is highly conductive, highly bendable and highly susceptible to soldering and welding. As shown, the lead wires are bent at a 90° angle and follow along the back surface of the base 30 within the well. The leads 46 and 48 each pass on one side of a bump 45 and the lead 48 passes between them, thereby insulating the leads from one another. The internal end of each lead 46, 47 and 48, inclusive, is turned-up at approximately 90°. Obviously, the leads 46, 47 and 48 can be preformed before insertion in their respective apertures or molded within the stationary base 30.

Figure 7:
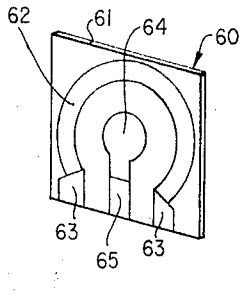
FIG. 7 is a view in perspective of a resistive element of the potentiometer of FIGS. 1 and 2 and designed to accommodate the brush of FIG. 6.
Figures 8, 9, 10:
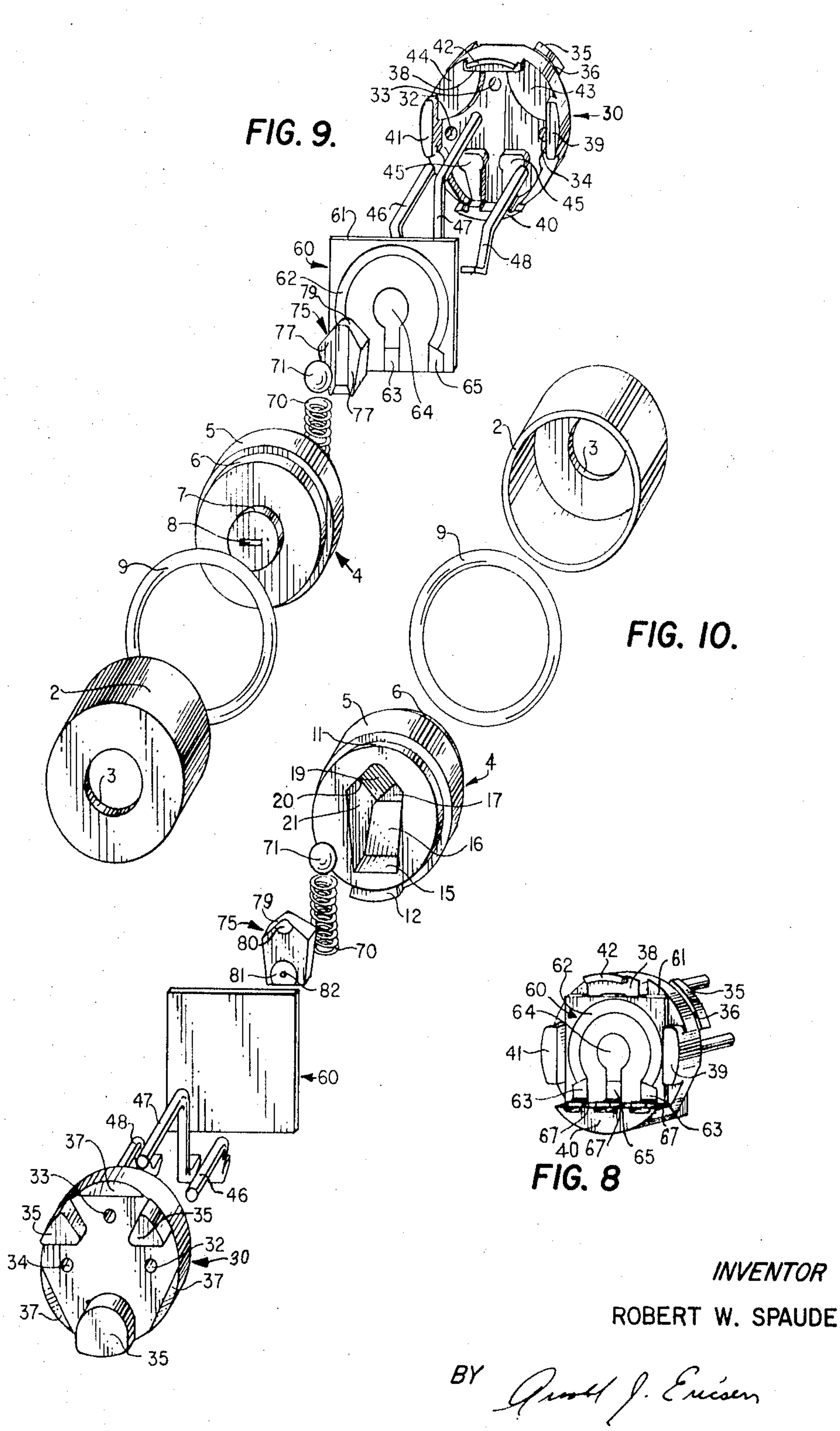
FIG. 8 is a perspective view of the stator component of FIG. 5 mounted with the resistive element of FIG. 7.
FIG. 9 is an illustrated exploded view in perspective of the potentiometer with the back surfaces of the various components most evident.
FIG. 10 is another exploded view in perspective of the potentiometer with the front surfaces of the various components most evident.

The illustrated potentiometer carries a film-resistive element 60 (see FIGS. 7, 8 and 9). The element 60 comprises a square-shaped, supporting medium 61 generally comprised of an insulative ceramic material. The medium 61 supports a first contact surface in the form of a fired-on, arcuate, printed resistive track 62 comprised of a material having a designated resistance according to the desired design and material makeup. Opposite ends of the resistive track 62 terminate at termination pads 63. The film resistive element 60 further carries a second contact surface in the form of a collector track 64 comprised of highly conductive material and illustrated in the form of a fired circular pattern. The center of the circular collector is substantially concentric to the center of the arcuate track 62. The collector track 64 extends to a third termination pad 65. The termination pads 63 and 65 are preferably of a material, e.g. gold or silver, which can readily withstand high temperatures and accommodate soldering or welding. Viewing FIGS. 5, 7 and 8, it may be further appreciated that by extending the termination pads 63 and 65 to the edge of the supporting medium 61, the leads 46, 47 and 48 may be engaged without providing holes within the medium 61 for the leads to protrude. The termination pads 63 and 65 are designed to accommodate the turned-up ends of the leads 46, 47 and 48. Also, the embodiment illustrates a rectangular-shaped resistive element 60. Obviously, the structure may be designed to accommodate arcuate resistive elements or resistive elements of other shapes. However, with present technology, rectangular-shaped elements are generally more easily and economically realized.

The film resistive element 60 is designed to fit within the confines of the positioning ears 38, 39, 40 and 41 and be supported by the ledges 43 and 44 and the insulating bumps 45 with with the resistance track 62 facing the cavity of the rotor 4. The resistance element is positioned such that the resistance track 62 is a relatively substantial radial distance from the casing 2 thereby realizing high leakage resistance between the track and casing. It may be noted that the corners of the supporting medium 61 are bare of resistance material or pads. Thus, during assembly, these corner areas can be contacted by a tool to aid the assembler. For example, a tool may clamp on two corners and also push on the element 60 for assembly.

Adhering the resistance element 60 and leads 46, 47 and 48 to the molded stationary element 30, is an adhesive epoxy 66 which is disposed within the well formed by the ledges 43 and 44 and the insulating bumps 45 (see FIG. 2). The epoxy 66 may be disposed within the well by placing a pellet or epoxy preform over one of the leads 46, 47 or 48 after the leads are in position. The pellet is then heated so that it melts and fills the well and the voids around the leads and the apertures 32, 33 and 34. Next, the resistance element 60 is positioned. Then the entire stationary assembly may be heated to cure the epoxy 66 and provide a secure unit. The forming of the leads 46, 47 and 48, and anchoring them with the epoxy provides mounted leads which can withstand substantial abusive handling of the exposed ends without dislocation of the embedded ends in electrical contact with the resistance and collector tracks. The assembly may then be placed in a solder bath thereby simultaneously providing a solder conection 67 between each of the pads 63 and 65 with the appropriate lead 46, 47 and 48.

Figure 6:
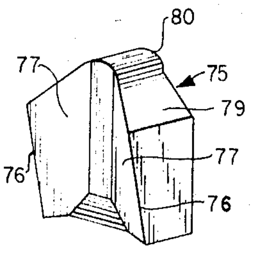
FIG. 6 is a perspective view of a conductive brush incorporated in the illustrated potentiometer. The back surface of the brush is most evident with the front surface hidden from view.

Within the cavity 10 of the rotor 4 is positioned a resilient member in the form of a low load rate helical coil spring 70 having a long free length and many turns with the longitudinal axis perpendicular to the rotational axis of the rotor 4. One end of the spring 70 engages the bottom surface 15. The other longitudinal end of the spring 70 cups a spherical member having a spherical surface portion, the member being ideally in the form of a ball 71. The ball 71 simultaneously contacts the top surface 19 of the cavity 10 and the back surface of a single piece brush member 75 comprised of highly conductive carbon black material of negligible resistance. (FIG 6 is an enlarged view of the brush 75.) The brush 75 fits within the cavity and has back surface edge 76 inclined towards the back of the cavity 10 opposing the inclination of the back surface 19. The back surface of the brush 75 carries a substantially V-shaped groove flanked by a pair of inclined planes 77, each of which contact the ball 71. The brush 75 has a substantially V-shaped top surface 79 designed to accommodate the V-shaped top surface 20 of the cavity 10. The front of the brush 75 carries two contact feet 80 and 81 separated a radial distance coinciding with the radial distance separating the resistance track 62 and the collector track 64 of the resistive element 60.

Viewing FIG. 2, when the brush 75 is in proper position, the combination of the spring 70 and ball 71 provides two component forces against the brush 75. One component of force urges the brush toward and in contact with the resistance element 60 thereby maintaining low contact resistance between the feet 80 and 81 and the associated resistance track 62 and collector track 64 while the other component of force is normal to the brush feet 80 and 81 thereby maintaining the brush feet 80 and 81 properly located on the tracks while rotation adjustment takes place. The force loading points of contact of the ball 71 with the inclined angular top surface 19 of the cavity 10 and the inclined back surface 77 of the brush 75 also provide location locking and keying of the brush 75 within the cavity. The 45° angle of the surface 19 reflects the force of the spring 70. Also, the use of a grooved substantially V-shaped back surface 77 of the brush 75 and the substantially V-shaped surface 19 of the cavity permits the ball to make two points of contact with each. This, in turn, permits the use of a brush with only two feet over the commonly used three foot brush, without sacrificing stability of the brush member. The two foot brush facilitates small size and retains minimum or no backlash between the rotor and brush during rotation adjustment.

Further, the second substantially V-shaped top plane 20 aids in the assembly process. The spring 70 and ball 71 can be preassembled in the cavity 10 and be self-retaining, before the brush 75 or stationary base 30 are assembled. When the ball 71 contacts the surface 20, there is little, if any, force tending to push the ball 70 out of the cavity 10.

On the illustrated embodiment, the engagement of the resistance element 60 and the brush 75 maintains the ball 71 against the inclined top surface 19. The ball 71 is permitted to travel along the inclined surface 19 between the normal surface 17 and the top surface 20. Thus, the brush 75 maintains engagement with the resistance element 60 even though the contacts 80 and 81 wear or there are dimensional differences in the various components. Consistency of brush-contact resistance depends largely upon the pressure of the brush against the resistance and collector tracks. To maintain substantially constant spring pressure, the design permits the use of a low load rate spring 71 having a long free length and many turns. Such a spring gives little force change with dimension change. Thus, there is substantially constant contact pressure between the brush contacts 80 and 81 and the contact surface 62 and 64 throughout the full range of brush movement along the surface 19. It may be further noted that the center contact foot 81 has a dimple depression 82 at the center. The dimple 82 is intended to prevent poor contact with the collector track surface 64 which may otherwise result from no wearing (wiping action) and at the same time not create off-center contacting surfaces that would cause a rotation force component to be transmitted to the brush. Also, the plane 16 makes an angle of slightly greater than 90° with respect to the plane 15. This is intended to aid in retaining the longitudinal axis of the spring 70 stable while permitting the spring to expand and compress without rubbing against the back surface 16.

Viewing FIGS. 9 and 10, the simplicity of assembling the apparatus can be appreciated. First, the stator 30 is assembled as previously discussed. That is, the leads 46, 47 and 48 are positioned and secured in place by the epoxy 66. The resistance element 60 is then positioned over the epoxy and the epoxy cured. Then the leads are soldered to the respective pads 63 and 65. Dipping into a solder bath has been found to be the most efficient means of soldering. Obviously, solder stops may be used during the dipping process to maintain the solder only to the desired areas of the terminals 63 and 65. When these steps have been accomplished, the stator 30 appears as in FIG. 8. The spring 70 and ball 71 are then positioned in the cavity 10. The O-ring 9 is then placed within the recess of the casing 2 and the rotor assembly 4 slid into position until the step 6 engages the O-ring 9 and the step 7 protrudes through the opening 3. Then the brush 75 is set within the rotor cavity 10 in the proper location. The stator 30 is then slid within the casing 2 until the step 36 engages the end of the casing 2. At this point, the brush feet 80 and 81 are in engagement with the contact surfaces 62 and 64. Completing the assembly, the casing 2, if metallic, is crimped over the flattened edge surfaces 37.

Once assembled, as the rotor 4 is rotated, for example by a tool inserted within the slot 6, the brush 77 bridging the resistance track 62 and the collector track 64 rotates varying the resistance between the pad 63 and the pad 65. Rotation is realized in either rotational direction and continues until the stop 12 on the rotor 4 engages the stop tip 42 on the positioning ear 38.

It may be noted that the leads 46, 47 and 48 may be positioned to properly accommodate the grid patterns of standard printed circuit boards. At the present time, the standard grid pattern has holes spaced apart in multiples of 0.025 inch. The above-described potentiometer is presently being constructed with the outlines of the leads forming an isosceles triangle. The linear distance between the leads 46 and 47 is 0.200 inch with the lead 48 equally spaced from the leads 46 and 47 with the vertical distance being 0.100 inch.

It should also be appreciated that the present invention provides a structure which is small in size while being easy to assemble. Also, the dimensional tolerances, even though there is small size, may be relieved. The economic advantages realized by these features is obvious. Also, the various components of the casing, rotor and stator are in general non-oriented so that little assembly time is spent in positioning the various components with relationship to one another.

It should be fully appreciated that though the preceding detailed discussion has been limited primarily to a potentiometer component, the invention is by no means so limited. For example, a switch may be realized by making one contact surface of highly conductive material and the other of at least two sections with one section being of highly conductive material and the other of insulative material. Thus, the brush can rotate between bridging two conductive surfaces (on position) and bridging a conductive and insulative surface (off position). Furthermore, a capacitive element could be realized by varying the dielectric value between the terminals as the rotor rotates.

With reference to the embodiment of FIGS. 11–18, inclusive, it will be observed that the present invention finds further application in linearly operated electronic components, i.e., rectilinear potentiometers.

Figure 11:
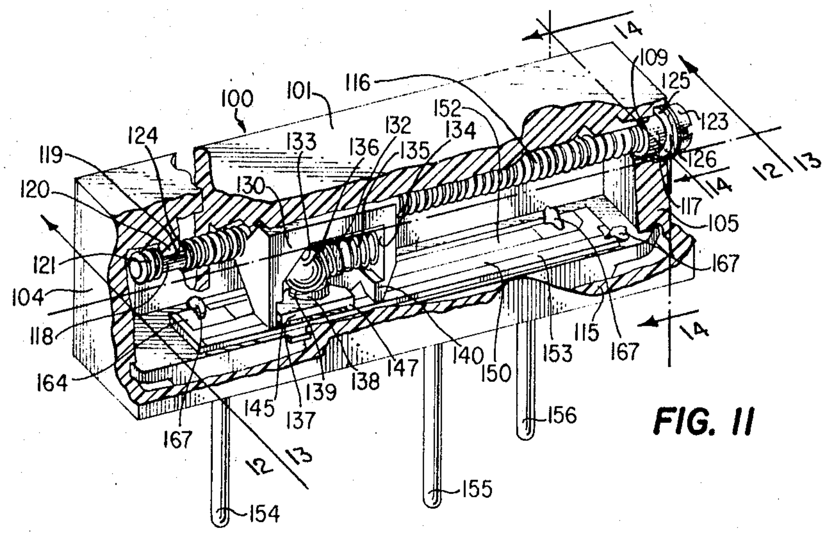
FIG.11 is a perspective view, partly in section of another embodiment of the present invention, and illustrating a rectilinear trimmer potentiometer.

With reference to FIG. 11, there is shown a variable resistor, suitable for use as a rheostat or potentiometer, having a box-like case 100 of elongated rectangular configuration preferably formed from an appropriate molded insulating material. The case 100 has a top wall 101, side walls 102, 103 and end walls 104, 105 which define a hollow interior. As disclosed in FIGS. 11–14, the top wall 101 and side wall 103 together define an interior longitudinal surface comprising three stepped portions 106, 107 and 108 joining one another respectively, and for purposes hereinafter described. A longitudinal opening 109 also extends through the end wall 105 to serve as a bearing. The side walls 102 and 103 are provided with longitudinal grooves 110 and 111 substantially coextensive with the length of the interior of the casing 100, to thereby form a resilient clamping seat for receiving an insulating base 115 that serves to enclose the interior of the case 100. The construction of the base 115 will hereinafter be more fully described. However, for present purposes, it is to be understood that the edges of the base 115 and/or the peripheral edges of the walls 102 and 103 of the casing 100 are further sealed together by means of an adhesive (not shown).

The case 100 rotatively supports a lead screw 116 that has a bearing portion 117 at one end thereof journaled in the opening 109. A reduced diameter portion 118 near the distal end of the lead screw 116 is designed to positively and continuously bear upon the arcuate surface 119 of an integral rib or boss 120 molded interiorly of the case 100. The lead screw 116 is machined to form the reduced diameter portion 118 with the remaining threaded portion 121 serving to provide a shoulder 122 which acts as a stop to prevent axial movement in a direction towards the headed portion 123 of the lead screw 116. The opposite side of the reduced diameter portion 118 of the screw 116 provides a shoulder 124 which acts to prevent axial displacement of the lead screw 116 in the opposite direction. It will be understood that the threads may be removed from the portion 121 if so desired, but are preferably permitted to remain to provide the shoulder 122 which bears against the boss 120.

The outer end of the opening 109 of the case 100 is enlarged to receive a resilient O-ring 125, which bears against the lead screw 116 and the surface of the enlarged portion. A washer 126 disposed between the outer surface of the end wall 105 and the slotted head portion 123 of the lead screw 116. The O-ring 125 serves as a seal. It has been the usual practice to provide a reentrant opening and add extra retaining clips in the casing for retaining the lead screw in similar devices. However, the present invention permits retention of the lead screw 116 against its bearing surfaces 109 and 119 by means of simplicity of design and manufacturing techniques. The screw 116 is of sufficient length to permit insertion in the opening 109, and by slightly canting the screw in a direction away from the upper surface 101 of the casing 100, the distal end of the screw will avoid contact with the boss 120 and permit seating against the surface 119 after being placed in position. Means for further retention will hereinafter be described.

Figure 12:
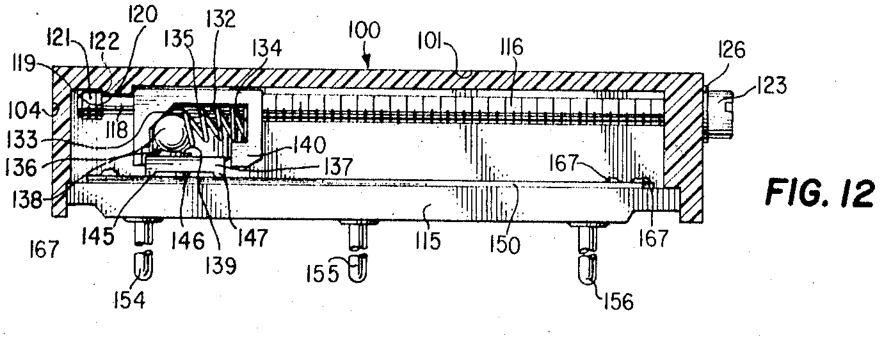
FIG. 12 is a longitudinal sectional view of the potentiometer taken on line 12—12 of FIG. 11, and illustrating the brush actuator at one end of its travel.
Figure 13:
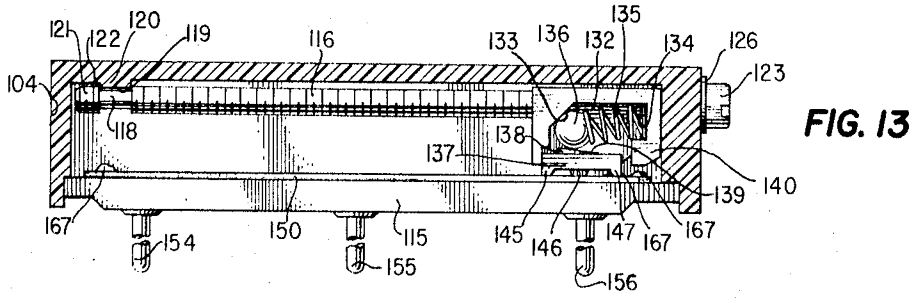
FIG. 13 is a longitudinal view, also taken on lines 12—12 of FIG. 11, but illustrating the brush actuator at the opposite end of its travel relative to the position shown in FIG. 12.
Figure 14:
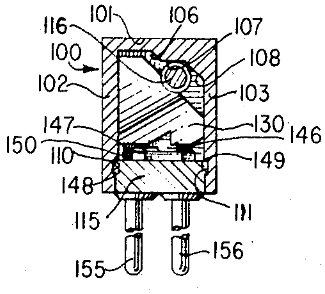
FIG. 14 is a cross-sectional view of the potentiometer taken on lines 14—14 of FIG. 1.

A brush actuator, or contact carrier, 130 (shown in its extreme operating positions in FIGS. 12 and 13, respectively) is provided, at its upper surface, with a threaded groove 131 (see FIG. 18) engageable with the threaded portion of the lead screw 116, so that upon rotation of the screw 116 the actuator 130 may be moved axially within the interior of the case 100 to the respective operating positions disclosed in FIGS. 12 and 13.

It will be observed that the brush actuator 130 is not unlike the actuator, or rotor, 4 of the embodiment of FIGS. 1–10. That is, the actuator, or carrier 130 includes a cavity 132 having an inclined forward surface 133 and an oppositely disposed rear surface 134. Disposed between these surfaces are positioned a resilient member in the form of a low load rate helical coil spring 135 having a long free length and many turns. One end of the sprin 135 engages the rear surface 134 of the cavity 132, whereas the other longitudinal end of the spring 135 cups a member having a spherical surface portion, the member being ideally in the form of a ball 136. The ball 136 simultaneously contacts the inclined surface 133 of the carrier 130 and the inclined back surface of the conducting brush member 137. The inclined back surface of the brush member may be formed by means of an integrally molded boss 138 having a top surface 139. The brush member 137 may be of any conductive material suitable for providing electrical engagement with the resistance track and collector track, which will hereinafter be described.

The brush member 137 is disposed in a relatively loose fit within the cavity 132 in an opening defined by the boss-like protrusion 140 (which also acts to retain the spring 135) and the opposite wall of the cavity opening. The brush preferably includes three contacting foot-like projections 145, 146 and 147. This arrangement provides a stable relationship for even contact pressure between the brush and its engaging surfaces, as will be later described.

As shown in the drawings, the base 115, is preferably molded of insulating material. When seated with its upper laterally extending flange portions 148 and 149 disposed in the grooves 110 and 111 of the side walls 102 and 103, respectively, and when sealed in place with an appropriate adhesive, the base 115 forms a cover for the supporting case 100. The elements 115 and 100 complete a fully enclosed housing that is dirt and water tight. No other means of retention, such as inserted pins as may be found in the prior art are required. The base 115 supports a film-resistive element 150. The element 150 comprises a rectangularly-shaped, supporting medium 151 generally comprised of an insulating ceramic material, including a first contact surface in the form of a fired-on, printed resistive track 152. The track 152 is of a material having a designated resistance according to the desired design and material makeup, which in the present case may be of a cermet composition. The support 151 also includes a conductive collector track 153 disposed in parallel relationship with the resistive track 152, which is also fired onto the ceramic dielectric base or support 151.

Figures 15, 16:
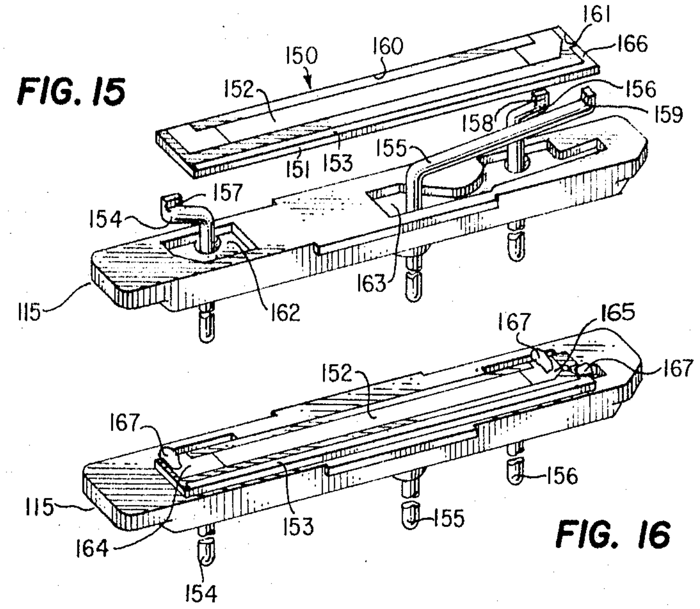
FIG. 15 is an exploded view of the components comprising the base member of the embodiment of FIG. 11.
FIG. 16 is a perspective view of the base member with each of its several components assembled together.
Figure 17:
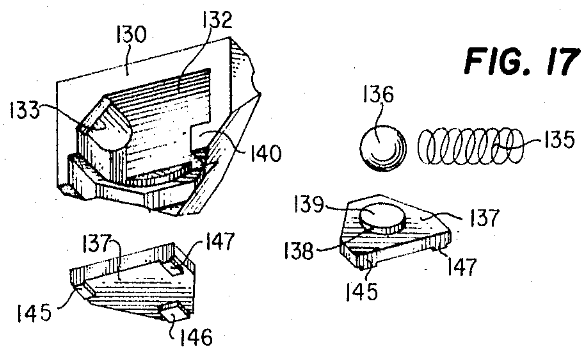
FIG. 17 is an exploded view of the brush actuator and its several conponents arranged to be seated within the cavity of the brush actuator.
Figure 18:
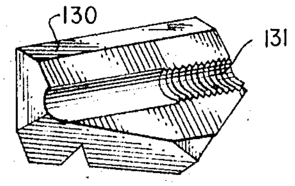
FIG. 18 is a perspective view of the upper surface of the brush actuator, indicating its threaded groove arranged for engagement with an adjusting lead screw.

It will be appreciated from the views of FIGS. 15 and 16 that the element 150 may be made as a separate and independent unit which is disposed in the base 115 in such manner as to permit ready orientation and simplicity in postioning relative to the terminal connections. That is, with reference to FIG. 15, it will be observed that base 115 may be of a molded plastic material having premolded apertures for receiving terminal leads 154, 155 and 156. The leads are preformed to a desired configuration such that the lead 154 is preferably flattened at its abutting contacting dege 157. The same is true of the edge 158 on the lead 156. The elongated terminal lead 155, which is electrically engageable with the collector track 153 is also flattened at the edge 159. The leads 154–156, inclusive, are loosely placed into the base 115 and are free to swing to their appropriate connecting position as shown in FIG. 15. The resistive element 150, which has been formed previously, is then inserted on top of the base and positioned with its flat side 160 against the flat edges 157 and 158 of the terminal leads 154 and 156, and further being oriented with its flat edge 161 in abutting relationship with the flat surface 159 of the terminal lead 155. The leads 154–156, are respectively stopped from further lateral movement by the walls of the respective cavities 162 and 163 of the base 115. It is preferable to provide cement on the adjoining surfaces of the element 150 and the base 115 to hold the element 150 in place with the upwardly bent portion of the lead 154 engaging one end of the resistive track 152 and the other lead 156 engaging the opposite end of the resistive track 152. As stated previously, the upturned end of the terminal lead 155 engages one end of the collector track 153. As may be seen in the views of FIGS. 15 and 16, there are fired-on termination pads 164 and 165 at opposite ends of the resistive track 152. These pads are preferably of the material such as gold or silver which can readily stand high temperatures and accommodate soldering or welding. The same is true of the termination pad 166 of the collector track 153. After the resistive element 150 is positioned as shown in FIG. 16, the terminations to the resistive track and the collector track are soldered in place as shown at 167 at each of the various terminations.

The base assembly 115 with the resistive element 150 soldered in place with each of the various connections to the terminal leads 154–156, is then positioned as previously mentioned within the confines of the case 100, being snapped in place by means of the grooves 110 and 111 in the side walls 102 and 103, respectively, with the addition of a cement for retaining the same in position in addition to providing a watertight seal. Prior to the positioning of the base within the casng, however, the brush actuator or contact carrer 130 will have been positioned with its threaded groove 131 disposed in threading engagement with the lead screw 116. The assembly of the carrier 130, including the ball 136 and its spring 135 is done previous to its insertion as a unit within the cavity, as the ball, spring, and actuator unit can be held together under the influence of the spring 135. The brush 137 is merely disposed with its surface 139 resting against the ball, and it is permitted to float in place within the actuator 130.

The contacting feet 145, 146 and 147 of the brush 137 rest respectively on the resistive track 152 and the collector 153 to provide a stable three-point engagement between the tracks and the feet of the brush, and this electrical engagement will be independent of any rotational forces imposed upon the brush actuator, or carrier 130.

I claim:

1. An adjustable electronic component comprising in combination:

a rectilinear casing having a top wall, side walls and end walls which is open at the bottom to present a four-sided receptacle having a hollow interior;

a base of insulating material positioned to enclose the interior of said casing and supporting an elongated resistance track substantially coextensive with and parallel to the top and side walls of said casing, said base including laterally spaced terminal leads extending outwardly therefrom and having their respective internal ends respectively electrically connected to said track;

a brush actuator within the casing and having a cavity which opens to the front face thereof, said cavity having a top surface portion sloped towards the front face of the cavity;

an electrically conductive brush member having a front surface portion engageable with said resistor track and the back surface thereof extending at least in part within the cavity of said brush actuator;

a compressible resilient member positioned and retained within said cavity;

a spherical member simultaneously engaging one end of the compressible resilient member, the sloped top surface portion of said cavity and the back surface of said brush member, said spherical member simultaneously maintaining the resilient member under compression and urging the front surface portion of said brush towards conducting engagement with the resistance track whereby the brush member is maintained in position with respect to the cavity of said brush actuator; and means for adjusting the position of said brush actuator relative to the casing and resistance track.

2. The adjustable electronic component of claim 1, wherein the brush actuator has a threaded surface, and the means for adjusting the brush actuator comprising a threaded lead screw rotatably supported by said casing and is threadingly engageable with the threaded surface of said brush actuator, said lead screw further including means externally of said casing for adjustably rotating the screw.

3. The adjustable electronic component of claim 1 wherein the said base supports elongated parallel spaced resistance and collector tracks and the front surface of said brush includes protruding spaced apart foot contacts respectively engageable with said tracks.

4. In an adjustable electronic component comprising, a rectilinear casing having a top wall, side walls, a closed end wall and an apertured end wall, which casing is open at the bottom to present a four-sided receptacle having a hollow interior;

a base of insulating material positioned to enclose the interior of said casing and supporting an elongated resistance track substantially coextensive with and parallel to the top and side walls of said casing, said base including laterally spaced terminal leads extending outwardly therefrom and having their respective internal ends respectively electrically connected to said track;

an electrically conductive brush member slidably engageable with said resistance track;

a brush actuator having an externally threaded surface portion; and means for adjusting the position of said brush actuator relative to the casing and resistance track, comprising a threaded lead screw extending interiorly of said casing rotatably supported at one end by said apertured end wall and engageable with the threaded surface portion of said brush actuator;

biasing means interposed between said brush and said brush actuator for simultaneously urging said brush towards engagement with said resistance track and said brush actuator towards said lead screw;

the combination therewith of means for supporting the interiorly extending distal end of said lead screw comprising:

an integrally formed interiorly extending portion of said top wall having an arcuate bearing surface for rotatably receiving said lead screw, said lead screw having a reduced diameter for a portion of its length intermediate its ends and of a dimension aproximately the diameter of the arcuate bearing surface of said inwardly extending top wall portion.

5. The adjustable electronic component of claim 4, wherein the brush actuator has a cavity which opens to the front face thereof and a cavity top surface sloped towards the front face of the cavity, the biasing means comprises a compressible helical spring residing in said cavity, and a spherical member simultaneously engaging the free end of said helical spring and the back surface of said brush member.

6. An adjustable electronic component comprising in combination:

a rectilinear casing having a top wall, side walls and end walls which is open at the bottom to present a four-sided receptacle having a hollow interior;

a base positioned to enclose the interior of said casing, comprising a member of molded insulating material including cavity portions defining apertures for receiving three of said terminal leads, the inner end portions of said terminal leads being formed to lie in a plane substantially parallel with the inner surface of said base and being seated within a respective cavity portion and freely rotatable therein, the inner distal end portion of each terminal being upturned and having a flat inner edge, a resistive element comprising a flat, rectangular member including said resistance and collector tracks, said resistive track having conductive end portions at opposite ends and terminating at one side of said element, said collector track extending to a side of said element normal to the resistance termination side, the flat edge of a respective terminal abutting the terminal edge of the tracks to provide a three-point positioning means for receiving said resistive element to thereby provide intimate contact electrical connection of said leads with the respective resistance and collector tracks, means for attaching said resistive element to said base, and means for securing said leads to said tracks;

an electrically conductive brush member slidably engageable with said resistive element;

a brush actuator within the casing; and means for adjusting the position of said brush actuator relative to the casing and resistive element.

7. An adjustable electronic component comprising in combination:

a rectilinear casing element having a top wall, relatively flexible side walls and end walls which is open at the bottom to present a four-sided receptacle having a hollow interior;

a base element of insulating material positioned to enclose the interior of said casing and supporting an elongated resistance track substantially coextensive with and parallel to the top and side walls of said casing, said base including laterally spaced terminal leads extending outwardly therefrom and having their respective internal ends respectively electrically connected to said track;

an electrically conductive brush member slidably engageable with said resistance track;

a brush actuator within the casing element;

means for adjusting the position of said brush actuator relative to the casing element and resistance track; and retaining means for said base element and casing element including spaced elongated parallel grooves in one of said elements and matching parallel flanges extending from the other of said elements, said flange and groove extending in a plane parallel with the flexible side walls of said casing element, wherein said flange may be snapped into interfitting engagement with said groove.

8. The retaining means for the adjustable electronic component of claim 7, wherein the elongated grooves are formed interiorly of the flexible side walls of said casing element and the flanges extending laterally from opposite sides of said base element.

References Cited

UNITED STATES PATENTS

| | | | |
|---|---|---|---|
| 3,373,396 | 3/1968 | Yungblut et al. | 338—183 |
| 3,365,691 | 1/1968 | Hillman | 338—183 |
| 2,537,671 | 1/1951 | Jack et al. | 338—202 X |
| 3,350,673 | 10/1967 | Spaude | 338—184 |
| 3,404,361 | 10/1968 | Wood | 338—143 |
| 2,860,217 | 11/1958 | Bourns | 338—180 |
| 3,050,704 | 8/1962 | Dickinson et al. | 338—180 |
| 3,179,910 | 4/1965 | Grunwald | 338—180 |

LEWIS H. MYERS, *Primary Examiner.*

A. T. GRIMLEY, *Assistant Examiner.*

U.S. Cl. X.R.

338—308, 180, 183, 202